No. 707,218. Patented Aug. 19, 1902.
H. P. EGEDAL.
GATE.
(Application filed May 23, 1902.)
(No Model.)
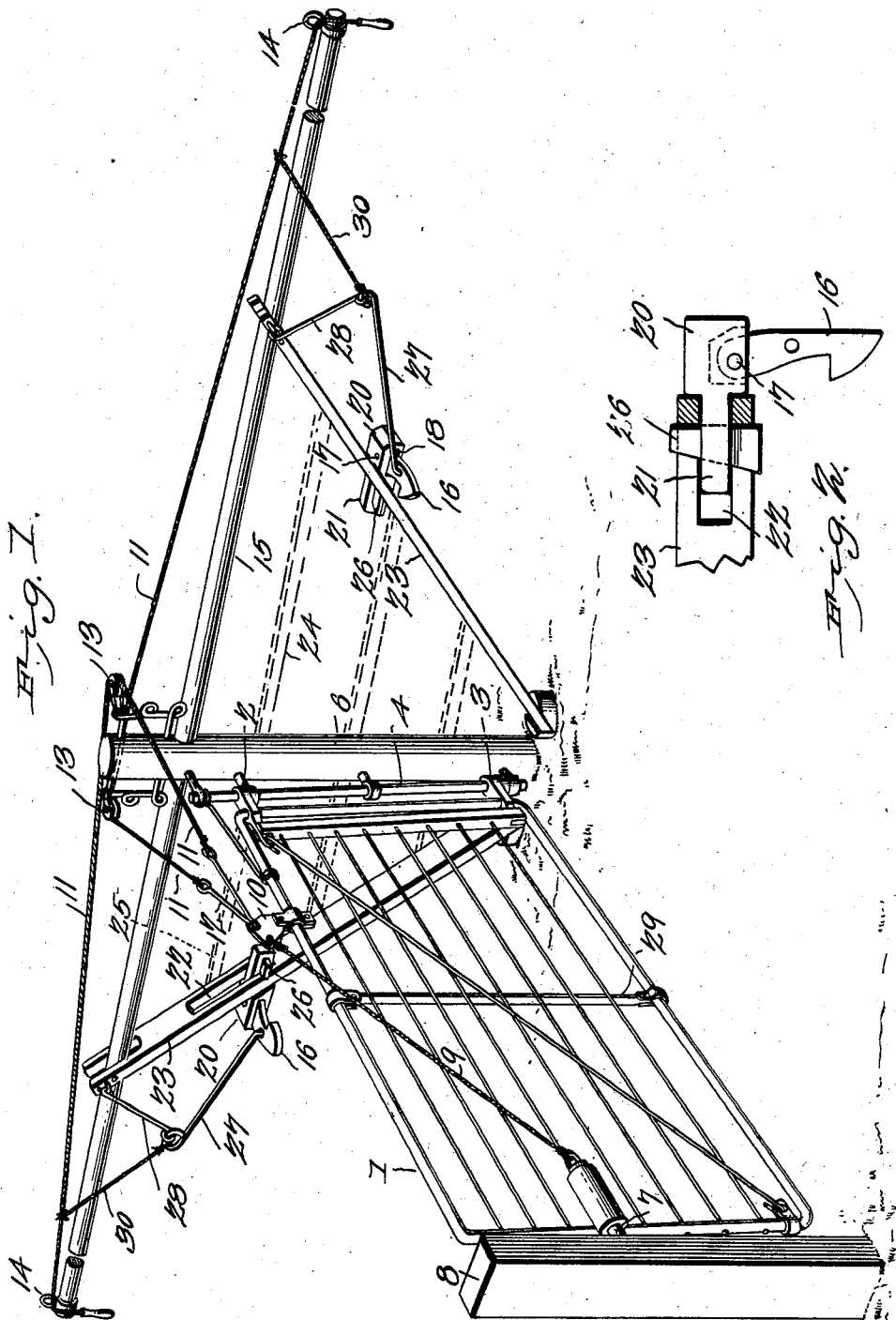
Witnesses
H. P. Egedal, Inventor.
by
Attorneys

UNITED STATES PATENT OFFICE.

HANS P. EGEDAL, OF THOR, IOWA.

GATE.

SPECIFICATION forming part of Letters Patent No. 707,218, dated August 19, 1902.

Application filed May 23, 1902. Serial No. 108,713. (No model.)

*To all whom it may concern:*

Be it known that I, HANS P. EGEDAL, a citizen of the United States, residing at Thor, in the county of Humboldt and State of Iowa, have invented a new and useful Gate, of which the following is a specification.

The invention relates to improvements in gates.

The object of the present invention is to improve the construction of swinging gates and to provide a simple, inexpensive, and efficient operating mechanism capable of enabling a gate to be opened and closed at a distance from either side of it by a person in a vehicle or on horseback.

A further object of the invention is to provide an operating mechanism of this character which will enable a gate to open always away from the operator, so that the gate will not come in contact with a horse or other draft-animal.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention. Fig. 2 is a detail sectional view illustrating the manner of mounting the pivoted supplemental latch and the manner of sliding the block which carries the latch.

Like numerals of reference designate corresponding parts in both figures of the drawings.

1 designates a swinging gate provided at its inner end with eyes 2 and 3, receiving an inclined pintle-rod 4, which also passes through eyes of a hinge-post 6, and the said inclined pintle is adapted to cause the gate in opening to swing upward slightly, whereby when it is released it will close automatically. The gate, which may be constructed in any desired manner, is provided at its front with a spring-actuated latch-bolt 7, adapted to engage a latch-post 8 and connected by a cord or rope 9 or other suitable flexible connection with a lever 10, and the latter, which is fulcrumed at the top of the gate, is connected with operating-ropes 11 by links 12; but any other suitable flexible connections may be employed. The operating ropes or cables, which extend rearward at opposite sides of the hinge-post 6, are crossed at the back of the post and are arranged in suitable guides 13, which are preferably provided with pulleys, and they extend a suitable distance from each side of the gate to enable them to be operated by a person on horseback or in a vehicle without the horse coming in contact with the gate. The outer ends of the operating ropes or cables are provided with suitable grips or handles and depend from guides 14, mounted on suitable supports, preferably formed by a horizontal bar 15, extending through and projecting from opposite sides of the hinge-post. When one of the operating ropes or cables is pulled upon, it draws upon the lever 10 from the opposite side of the gate, and when the gate is closed it releases the spring-actuated latch and opens the gate.

A pair of supplemental latches 16 are located at opposite sides of the gate, and each supplemental latch is pivoted by a pin 17 or other suitable fastening device in a recess 18 of a slidable block or support 20. The slidable block or support 20 is provided with a shank 21, which is arranged in a slot 22 of an inclined bar 23, forming a brace for the horizontal bar 15 and preferably connected with the hinge-post by horizontal bars 24 and 25. The shank 21 is slotted to receive a key 26, and the supplemental latch 16, which is capable of a limited horizontal swinging movement, is connected with an inclined rod 27, which has its upper or outer end supported by a link-rod 28. The rod 28 is provided at its ends with eyes, the lower one being linked into an eye of the rod 27 and the upper one being linked into an eye of the upper end of the inclined bar or brace 23. The inclined bar or brace 23 has its upper end bifurcated to receive the horizontal bar 15, and it is secured to the same by a suitable fastening device. The weight of the link 28 and the rod 27 is adapted to swing the supplemental latch inward into engagement with the gate, which is provided with a central bar 29, arranged to be engaged by the supplemental latches; but the supplemental latches may be arranged to engage any other desired portion of the gate. The upper end of the rod 27 is connected with the adjacent operating rope or cable by a short flexible connection 30, consisting of a rope or cable, and when the adjacent operating rope or cable is pulled the first portion of the movement disengages the latch by swinging the same on its pivot 17, and the rest of the movement of the operating rope or cable closes the gate, the sliding movement of the block on the supporting bar or brace 23 permitting such movement and allowing the rod 27 to be drawn upward and outward with the operating rope or cable.

The main latch-post may be provided with any suitable form of keeper or means for receiving the latch 7, and in practice suitable means will be provided for preventing the gate in closing from swinging beyond the latch-post. The gate is preferably braced by means of an inclined rod 1ª, extending from the top of the gate to the upper portion of the pintle. The bar 15 may be supported in any desired manner, and the supplemental latches may be mounted on vertical posts or any other suitable support.

It will be seen that the gate is exceedingly simple and inexpensive in construction, that it is positive and reliable in operation, and that it is adapted to be opened and closed at a distance from either side of it.

What I claim is—

1. The combination of a swinging gate having a latch, operating ropes or cables connected with the gate, slidable blocks capable of upward and downward movement and located at opposite sides of the gate, supplemental latches movably mounted on the blocks, and means for connecting the supplemental latches with the operating ropes or cables, substantially as described.

2. The combination of a swinging gate having a latch, slidable blocks located at opposite sides of the gate and capable of upward and downward movement, supplemental latches movably mounted on the blocks, and operating mechanism connected with the gate and with the latches, substantially as described.

3. The combination of a swinging gate having a latch, slidable blocks mounted at opposite sides of the gate, supplemental latches carried by the blocks, and operating mechanism connected with the gate and with the latches, substantially as described.

4. The combination of a swinging gate, inclined bars located at opposite sides of the gate, blocks slidably mounted on the inclined bars and capable of upward and downward movement, supplemental latches pivotally mounted on the blocks and arranged to swing horizontally, and operating mechanism connected with the gate and with the latches, substantially as described.

5. The combination of a swinging gate having a latch, a hinge-post, a horizontal bar extending from the hinge-post, inclined braces supporting the horizontal bar and provided with slots, blocks slidably mounted in the slots, supplemental latches mounted on the blocks and carried by the same, operating ropes or cables crossed at the back of the gate and connected with the same and with the latch of the gate, said ropes or cables having their outer portions supported by the horizontal bar, and means for connecting the supplemental latches with the operating ropes or cables, substantially as described.

6. The combination of a swinging gate, blocks slidably mounted at opposite sides of the gate, supplemental latches mounted on the blocks, inclined rods connected with the supplemental latches, links supporting the rods, and operating mechanism connected with the gate and with the rods, substantially as described.

In testimony that I claim the foregoing as my own I have hereto affixed my signature in the presence of two witnesses.

HANS P. EGEDAL.

Witnesses:
ANDREW HALSTENRUD,
R. S. THOMPSON.